United States Patent Office 3,512,844
Patented May 19, 1970

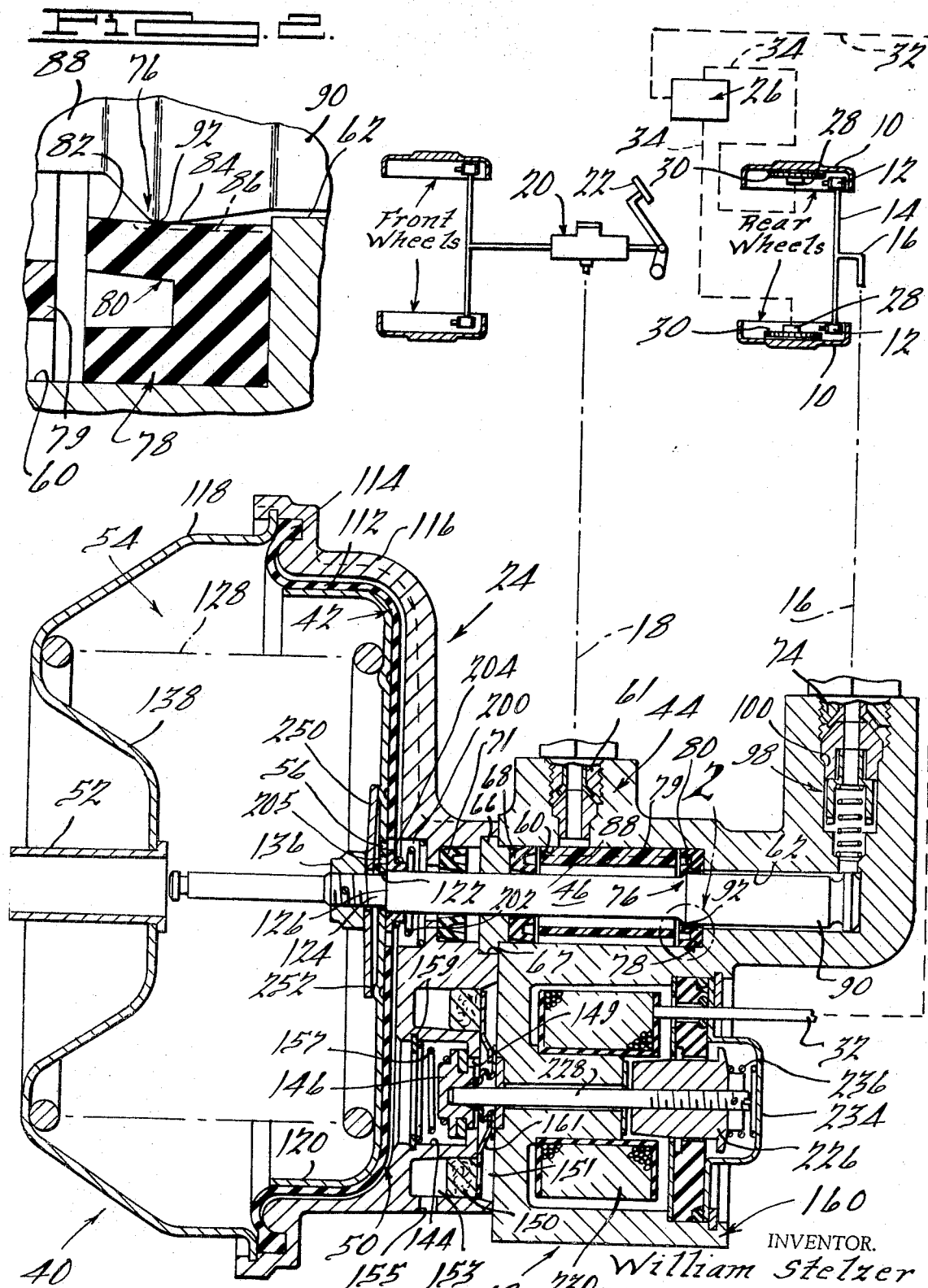

3,512,844
SKID CONTROL SYSTEM INCLUDING HYDRAULIC MODULATING AND PROPORTIONING VALVE
William Stelzer, Bloomfield Hills, Mich., assignor to Kelsey-Hayes Company, Romulus, Mich., a corporation of Delaware
Filed Jan. 31, 1968, Ser. No. 702,094
Int. Cl. B60t 8/12, 8/26
U.S. Cl. 303—21                     1 Claim

ABSTRACT OF THE DISCLOSURE

A skid control system for fluid actuated brakes of a wheeled vehicle including a modulating valve for modulating the fluid pressure to the fluid actuated brakes and for proportioning the pressure between front and rear brakes.

---

The present invention relates to skid control systems, and more particularly relates to a skid control system including a novel control or modulating valve.

It is an object of the present invention to provide a novel skid control system for controlling the brakes of the wheels of a wheeled vehicle.

It is an object of the present invention to provide a novel proportioning valve for proportioning the pressure between front and rear brakes.

It is another object of the present invention to provide a novel modulating or control valve for use in a skid control system for controlling the brakes of the wheels of a wheeled vehicle.

It is another object to provide a novel modulating and proportioning valve for providing skid control and proportioning.

It is another object of the present invention to provide a novel skid control system for fluid actuated brakes for wheels of a wheeled vehicle including a novel modulating or control valve for modulating or controlling the pressure to the brakes in response to an electrical signal indicating the occurrence or the imminence of a wheel skid condition.

Other objects, features, and advantages of the present invention will become apparent from the subsequent description and the appended claim, taken in conjunction with the accompanying drawings, in which:

FIG. 1 is a generally schematic diagram of a skid control system embodying features of the present invention with the modulating and proportioning valve shown in elevation with some parts broken away and others shown in section; and FIG. 2 is a blown up view of the portion of FIG. 1 indicated by the numeral 2.

The skid control system of the present invention can be utilized and will be described specifically for use with an automotive vehicle; however, it should be understood that the features of the invention could be utilized with other types of wheeled vehicles. For an automotive vehicle, the system of the present invention can be utilized in connection either with the front wheels, the rear wheels or the front and rear wheels. The system will be described for use in conjunction only with the rear wheels of an automotive vehicle; the present invention is a modification of the apparatus and system shown and described in the copending patent application of Peter Every and William Stelzer, Ser. No. 642,861, filed June 1, 1967 and that disclosure is incorporated herein by reference.

Looking now to FIG. 1, the drawing generally shows the skid control system for use with the rear wheels of an automotive vehicle with the rear wheels being equipped with brake drums 10 and wheel brake cylinders 12. Hydraulic lines 14 are connected to the cylinders 12 and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connected between the fluid lines 18 and 16, and hence the modulating valve 24 can control the fluid pressure to the wheel brake cylinders 12 and hence can control the operation of the brakes. The brakes associated with the brake drum 10 can be of a conventional construction and hence the details thereof have been omitted for the purposes of simplicity.

The modulating valve 24 in the present system is actuated in accordance with an electrical signal obtained from an electrical control module 26. The control module 26 receives information from sensors 28 associated with each of the brake drums 10 by means of exciter rings 30. The exciter rings 30 and sensors 28 can be of constructions known in the art and since the specific details thereof do not constitute a part of the present invention they have been omitted for the purposes of simplicity. The exciter rings 30 can be of a toothed construction and the sensors 28 can be of a permanent magnet or electromagnetic construction which together define a variable reluctance pickup. The exciter rings 30 would be rotated with the brake drums 10 and hence with the associated wheels, and by virtue of the toothed construction, could via sensors 28 generally provide a pulsating or alternating electrical signal via conductors 34 to the module 26 which signal would be an indication of the rotational velocity of the associated wheels.

The control module 26 can be constructed to sense the rate of change in the signal at the conductors 34 and hence to sense the deceleration rate of the wheels associated with the brake drums 10 and to provide an output signal in response to the magnitude of the deceleration of the wheels associated with the brake drums 10 reaching a preselected magnitude corresponding to a skid condition existing or to be occurring at the wheels associated with drums 10. The output or control signal will be transmitted by means of conductor 32 to the modulating valve 24. In the system of the present invention the control module 26 can provide merely an "on" or "off" signal and modulation of the fluid pressure to the brake cylinders 12 will be provided by the modulating valve 24. In some skid control systems the fluid pressure to the brakes is varied in response to an electrical output signal of varying magnitude. In the present invention, the fluid pressure is varied by the valve 24, in response to a signal of generally constant amplitude which permits the remainder of the system to be simplified.

The skid control system of the present invention for fluid actuates brakes for braking of the vehicle varies or controls the fluid pressure to the brake system. Under certain road conditions application of maximum brake pressure (or less) will result in skidding and a locked-wheel and/or skid condition. If the vehicle wheels are locked or are skidding excessively, the coefficient of friction between the surface of the road and the vehicle tire decreases and the effectiveness of the brake system in stopping the vehicle is substantially reduced.

In the system of the present invention, the modulating valve 24 in response to the output signals from the module 26 will provide for a modulated brake pressure. It has been found desirable to provide for increased braking at the fronts to compensate for weight transfer to the front wheels during braking (see U.S. Pat. No. 3,258,924 to William Stelzer, issued July 5, 1966). The valve 24 provides for this proportioning function in addition to providing skid control.

In general the modulating valve 24 has a vacuum chamber housing 40 divided by a diaphragm assembly 42. A hydraulic cylinder housing 44 is mounted to the housing of the vacuum chamber housing 40 and has slidably located there in a hydraulic piston 46 which is mechanically linked to the diaphragm assembly 42. Mounted to one side of the hydraulic cylinder housing 44 is solenoid 48 whose plunger seats itself over an atmospheric air inlet port to shut off the introduction of atmospheric air pressure into one side 50 of the vacuum chamber housing 40 when no skid control is indicated. The vacuum housing chamber 40 is held at vacuum through engine (not shown) vacuum via engine vacuum line 52 which communicates to the other side 54 of the vacuum chamber 40. An opening 56 through diaphragm assembly 42 communicates the opposite side 50 to vacuum. When the control module 26 provides an output signal indicating a skid condition energization of the solenoid 48 occurs and the solenoid plunger is unseated from the atmospheric air inlet port allowing atmospheric air pressure to enter the opposite side 50 of the chamber housing 40. With the differential pressure created the diaphragm assembly 42 is moved permitting the hydraulic piston 46 to move. As the piston 46 moves the available volume within the hydraulic cylinder housing 44 increases and at the same time a check and proportioning valve 76 is seated cutting off any further application of master cylinder pressure to the brakes of the wheels being skid controlled. The brake cylinder pressure which has already been built up will be relieved by flowing into the increased volume created in the hydraulic cylinder housing 44 by the movement therefrom of the hydraulic piston 46. With relief of brake cylinder pressure the associated wheel can spin up or increase in speed and the control module 26 will deenergize the solenoid 48 allowing the plunger of solenoid 48 to return with the atmospheric air inlet port being closed again and the vacuum returning to side 50 via port 56. In this condition the piston 46 and diaphragm assembly 42 return towards their original positions. At the original position of piston 46, the check valve 76 is unseated permitting master cylinder pressure to be applied through the valve 24 directly to the brake cylinders 12.

The hydraulic cylinder housing 44 is connected to a generally cup shaped chamber section 116 of the vacuum chamber housing 40 and has a first cylinder 60 which has one end connected to the hydraulic line 18 from the master cylinder 20 via a conventional fitting assembly 61. The cylinder 60 houses the check valve 76. The first cylinder 60 is connected to a relief cylinder 62 in which is located the hydraulic piston 46. The relief cylinder 62 is connected in line with an enlarged bore 67. A support bearing 66 is located in the bore 67 and slidably supports the piston 46. The piston 46 extends into the relief cylinder 62 in radially clearance relation and is also extensible into the vacuum chamber housing 40. A hydraulic seal 68 is located adjacent bearing 66 at the end of the enlarged portion 69 of cylinder 62 and provides a fluid seal against the surface of the piston 46. At the inner end of the enlarged bore 67 is located a vacuum seal assembly 71 which prevents loss of vacuum from the one side 50 of the vacuum chamber housing 40.

The fluid line 16 is connected in fluid communication with the relief cylinder 62 via hydraulic fitting assembly 74 and hence fluid to the brake cylinders 12 must pass from line 18 through cylinder 60, and relief cylinder 62 to line 16.

The check and proportioning valve assembly 76 (see FIG. 2) is located in the cylinder 60 and incldues a flexible valve seal 78. The valve seal has a radially inner flexible seal 80 which has a sealing lip portion 82 and a valve portion 84 with the valve portion being defined by a plurality of longitudinally extending grooves 86. The plunger 46 has a small diameter portion 88 located in cylinder 60 and an enlarged diameter portion 90 located in relief cylinder 62. A shoulder 92 is defined by the juncture between portions 88 and 90 and is shaped to form a ridge having a diameter larger than that of portions 88 and 90; as will be seen the diameter of portion 88 is selected to provide a skid control function while the diameter of ridge 92 is selected to provide a proportioning function. A spacer 79 is located between seals 68 and 78 and is externally grooved to permit passage of fluid. The hydraulic piston 46 is normally held in the position shown in engagement against the end of relief cylinder 62. In a normally deactuated condition of the modulating valve 24 with the piston 46 located as shown, the ridge 92 is located in line with the grooves 86 in seal 80 whereby fluid communication is maintained between cylinders 60 and 62 and hence between master cylinder 20 and rear wheel brake cylinders 12. In this condition normal braking can be effectuated. Upon the occurrence of a skid condition whereby a skid control output signal is derived from the control module 26, the piston 46 is moved outwardly (in a manner to be described) from the relief cylinder 62 whereby the sealing lip portion 82 engages the large diameter portion 90 whereby the cylinder 62 is sealed from further application of pressure from master cylinder 20. At the same time this movement of piston 46 creates an increase in available volume in relief cylinder 62 whereby the pressure at brake cylinders 12 will be relieved resulting in a reduction in the slip or tendency to skid of the rear wheels 10 whereby skid control is effectuated. The enlarged diameter portion 90 is selected to have a diameter relative to the size of relief cylinder 62 such that movement of the piston 46 will result in adequate brake pressure relief. Note that as portion 90 is moved to relieve brake pressure it enters cylinder 60 decreasing its volume resulting in an increase in pressure back to the master cylinder 20 whereby an increase in resistance to the brake pedal 22 results; this tends to resist increases in pressure to the front wheels through master cylinder 20. Upon termination of the skid control signal from module 26 the piston 46 will return whereby pressure to the rear wheel cylinders 12 is increased.

A conventional duck-bill residual pressure valve assembly 98 is located in a cavity 100 between relief cylinder 62 and line 16 and acts to maintain a residual pressure in the brake cylinder 12; the duck-bill valve 98 is used when the rear wheel brakes are shoe brakes to maintain the linings in light engagement with the drum; for conventional disc brakes the valve assembly 98 can be eliminated.

The piston 46 is freely sliding within the support bearing or bushing 66 and is actuated by the diaphragm assembly 42 located within the vacuum chamber housing 40. The assembly 42 includes a flexible diaphragm member 112 which has an annular outer bead 114 which is sealingly clamped between a flange on the chamber section 116 and a flange of a cap section 118. The sections 116 and 118 define the vacuum chamber housing 40. A generally cup-shaped power or diaphragm plate 120 is located in engagement with the diaphragm member 112, with the diaphragm member 112 being flexible and taking the shape of the power plate 120. The diaphragm assembly 42 divides the vacuum chamber housing 40 into the section 50 on one side and section 54 on the other side.

A coil spring 128 has one end in engagement with the cap section 118 and has its opposite end in engagement with the power plate 120. Spring 128 is precompressed to bias the power plate 120 forcing that member to its extreme inner position in the vacuum chamber section 50. The power plate 120 has a central bore 122 through which a reduced diameter portion 124 of the piston 46 extends. A shoulder 126 defined by portions 88 and 124 engages the power plate 120 and hence normally the piston 46 will be maintained in the position shown by the power plate 120 via the bias of spring 128. In the deactuated condition of valve 24, the spring 128 maintains the power plate 120 and hence the diaphragm 112 at its innermost position in section 50 of the vacuum chamber housing 40.

The bias of the spring 128 is selected to provide a preload of sufficient magnitude to overcome the maximum force on the piston 46 as the result of the maximum fluid pressure in the cylinders 60 and 62 acting on the piston 46.

Vacuum line 52 is connected at a dished portion 138 in communication with the interior of vacuum chamber 54 at one side of diaphragm assembly 42. Upon actuation of the modulating valve 24, air pressure via the atmosphere is applied to the section 50 of the vacuum cylinder chamber housing 40. The area of the diaphragm assembly 42 is sufficient such that the air pressure will provide a force great enough to overcome the bias of spring 128 to move the diaphragm assembly 42 toward vacuum section 54 until a stop nut 136 located on the threaded portion 124 engages the inner end of vacuum line 52. At this point the maximum relief of the fluid pressure to the brakes is obtained.

The cylinder housing 44 has a housing portion 160 which holds the solenoid 48. A bore 144 through section 116 communicates the chamber 50 with atmosphere through an opening 149, a counterbore 151, and annular bore 153 and ports 155. The opening 149 is generally closed by an annular sealing member 146 held by a spring 157 and retaining washer 159. An annular air filter member 150 is held within the annular bore 153 by means of a retainer assembly 161. With the sealing member 146 in the position shown in FIG. 1 bore 144 is sealed from opening 149 and hence from atmospheric air pressure.

The solenoid 48 includes a movable armature assembly 226 and includes a plunger 228 connected thereto and is actuated by energization of a plurality of windings 230 connected to conductor 32 from module 26. The armature assembly 226 includes spring 236 located at its outer end and engageable with an end cap 234 on housing assembly 160. Upon energization of the solenoid 48, the armature 226 is drawn inwardly moving the plunger 228 inwardly. Plunger 228 engages seal 146 moving it from the opening 149 opening a path therearound whereby atmosphere will be communicated to chamber 50. As this occurs the diaphragm 112 is moved away from a throttle valve assembly 200. The throttle valve assembly 200 includes a coil spring 202 and seal 204; in the deactuated position the spring 202 holds seal 204 against pressure plate 120 and seals openings 205 such that in this position only opening 56 substantially communicates sides 50 and 54. With the pressure plate 120 at its fully actuated position, at which openings 56 and 205 will communicate sides 50 and 54 and spring 202 will locate seal 204 at a preselected location whereby on the return of pressure plate 120, seal 204 will block ports 205 before pressure plate 120 fully returns; this provides a throttling effect. Upon the rear wheels 10 spinning up and cessation of the signal from module 26 solenoid 48 will be deenergized and will return whereby seal 146 will block opening 149 closing off chamber 50 from atmosphere; pressure between chambers 50 and 54 will rapidly tend to equalize air flow through ports 56 and 205 whereby the assembly 42 will be rapidly returned by spring 128 causing rapid reapplication of brakes via piston 46. At a preselected position, pressure plate 120 will engage seal 204 blocking ports 205 thereby restricting the flow of air between chambers 50 and 54 causing assembly 42 to slow down resulting in brake pressure being applied at a reduced rate (see copending application of Every et al., supra). As the piston or plunger 46 moves near its full return position the ridge 92 will be moved from the sealing lip 82 and onto grooves 86 which initially will be opened slightly to permit a gradual increase in pressure; thus ridge 92 and grooves 86 of valve 76 act like a bleed valve tending to prevent a rapid and sudden increase in pressure after seal 82 is opened; this is desirable since a rapid increase in pressure could result in the occurrence of another skid condition. A Belleville spring washer 250 is precompressed between nut 136 and an annular interrupted ridge 252 serving as a fulcrum on plate 120. Communication between chambers 50 and 54 is through the clearance between washer 250 and plate 120 intermediate the fulcrum 252 and via port 56. During a skid cycle when the wheel cylinder pressure is being released while plunger 46 moves to the left, the seal 204 follows plate 120 a short distance and becomes separated when spring 202 to which it is attached is expanded. The spring 202 is held in a groove in the housing. Further movement of plunger 46 to the left exposes ports 205 so that communication between chambers 54 and 50 is slightly increased. This slows down the movement of piston 46 and prevents substantial overtravel due to a delay in termination of the signal from the electric module when the wheel skid has stopped. On further movement of plunger 46 to the left the wheel cylinder pressure is further reduced and the master cylinder pressure is maintained or increased; however, an increase in master cylinder pressure causes an increase in the hydraulic pressure in the chamber 60 resulting in an increased force on plunger 46 to the right. The differential air pressure in chamber 50 is still maintained; the force on plunger 46 tending to move it to the right collapses spring washer 250 so that the diaphragm plate 120 moves away from the shoulder 126 against which it had been biased. The plate has some small axial projections at its central portion so that the washer 250 never seals off port 204 or closes the gap entirely. Movement of plate 120 away from the shoulder 126 of plunger 46 opens a new passage via the clearance at 122. This further reduces movement of plunger 46 to the left when the wheel cylinder pressure has already been relieved and aids in preventing overtravel.

The valve 76 performs a proportioning valve function during non-skid control braking. Upon normal brake application the fluid pressure in cylinders 60 and 62 act on piston 46 tending to move it into the chamber housing 40. Movement of piston 46, however, is opposed by spring 128 via pressure plate 120 acting on shoulder 126 of piston 46.

The effective cross-sectional area (as defined by the diameter of portion 88) of piston 46 is selected to overcome the bias of the spring 128 at a preselected pressure (see patent to Stelzer, supra). When the piston 46 moves with ridge 92 in line with sealing lip 82 the cylinder 62 (and hence rear brake cylinder 12) is blocked from cylinder 60 and master cylinder 20. Upon further application of force to pedal 22 the pressure to the front wheel brake cylinder will be increased; however, increased pressure to the rear wheel cylinder 12 will be temporarily blocked by ridge 92 and seal 82. The trapped fluid in cylinder 62 will be acting on a total area represented by the diameter of ridge 92 tending to hold the ridge 92 and seal 82 engaged; this force is balanced and opposed by the force of spring 128 and the master cylinder pressure in cylinder 60; upon an increase in master cylinder pressure this balance will be overcome and ridge 92 will be moved slightly in grooves 86 permitting some fluid pressure to bleed into cylinder 62. Since the fluid pressure in cylinder 62 is acting on a larger area than that in cylinder 60 only a portion of the increase in pressure in 60 is required to balance the piston 46 again at its closed position. Thus only a selected proportion of the increase in fluid pressure will be transmitted to the rear brake cylinders 12 resulting in the desired proportioning effect. This proportion is set by the ratio of the area of ridge 92 less the area of portion 88 to the area of the ridge 92. Note that the volume of ridge 92 is small and does not appreciably affect the skid control action, i.e., pressure relief, as determined by portion 90.

Thus the apparatus of the present invention functions as a skid control value having a bleed valve feature and a proportioning valve.

What is claimed is:

1. In a skid control system for controlling fluid pressure actuated brakes of at least one wheel of a wheeled vehicle and controlling the fluid pressure to the brakes and including means for producing a skid control signal in response to a wheel skid condition,
  a modulating valve for modulating the fluid pressure and including means defining a cylinder having first and second axially spaced bores,
  fluid passage means communicating said first bore with the vehicle brake being skid controlled,
  a plunger member extending coaxially within said cylinder and being axially movable in response to a skid control signal,
  an annular flexible valve seal disposed within said cylinder in said first bore adjacent said second bore,
  said valve seal comprising first and second valve portions adjacent said first and second bores, respectively,
  said plunger member comprising a first relatively enlarged diameter portion disposed within said first bore and a second relatively reduced diameter portion disposed within said second bore,
  said plunger member further comprising a sealing surface portion between said first and second diameter portions and spaced radially outwardly therefrom and selectively cooperating with said first and second valve portions upon reciprocal movement of said plunger member with said cylinder,
  means resisting reciprocal movement of said plunger member in one direction within said cylinder and said plunger member having a preselected effective area responsive to the fluid pressure in one of said bores for overcoming said bias, whereby movement of said plunger member provides a fluid proportioning function operable in the absence of a skid condition for providing a preselected lower pressure at the brakes of the rear wheels of the vehicle relative to the pressure at the brakes at the front wheels of the vehicle,
  said first portion of said valve seal comprising a bleed valve for providing restricted fluid communication between said first and second bores, and said second valve portion of said valve seal comprising an annular sealing lip engageable with said sealing surface to provide a blocking valve means for precluding fluid communication between said first and second bores, and
  said first diameter portion of said plunger member being movable toward said second bore in response to said skid control signal, thereby increasing the effective volume of said first bore for relieving pressure to the vehicle brakes.

References Cited

UNITED STATES PATENTS

| | | | |
|---|---|---|---|
| 3,093,422 | 6/1963 | Packer et al. | 303—21 |
| 3,315,469 | 4/1967 | Stelzer | 303—6 XR |

FOREIGN PATENTS 911,096   11/1962   Great Britain.

MILTON BUCHLER, Primary Examiner

J. J. McLAUGHLIN, Jr., Assistant Examiner

U.S. Cl. X.R.

188—132, 181; 303—6

PO-1050
(5/69)

UNITED STATES PATENT OFFICE
CERTIFICATE OF CORRECTION

Patent No. 3,512,844          Dated May 19, 1970

Inventor(s) William Stelzer

It is certified that error appears in the above-identified patent and that said Letters Patent are hereby corrected as shown below:

Column 2, line 55, delete "actuates" and substitute therefor
--actuated--
Column 6, line 75, delete "and" and substitute therefor --by--
Column 7, line 25, delete "with" and substitute therefor --within--

SEALED
SEP 1 - 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,512,844          Dated May 19, 1970

Inventor(s) William Stelzer

It is certified that error appears in the above-identified patent and that said Letters Patent are hereby corrected as shown below:

Column 7, line 12, delete "first" and substitute therefor --second--;

Same line, delete "second" and substitute therefor --first--.

Column 7, line 30, delete "said" and substitute therefor --the--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents